Patented June 12, 1928.

1,673,032

UNITED STATES PATENT OFFICE.

ROGER WILLIAMS, OF WILMINGTON, DELAWARE, ASSIGNOR TO LAZOTE INC., OF WILMINGTON, DELAWARE, A CORPORATION OF DELAWARE.

PROCESS OF PRODUCING HYDROGEN.

No Drawing. Application filed August 5, 1926, Serial No. 127,441. Renewed November 8, 1927.

This invention relates to the production of hydrogen particularly by a catalytic reaction between hydrocarbons and steam.

The reaction has been suggested heretofore, for example, in the U. S. Patent No. 1,128,804, but the process described in that patent requires the use of relatively high temperatures above 700° C. and results in a product which is not adapted for many purposes because of the presence of excessive amounts of carbon monoxide therein. A process has been described in the application of Roger Williams, Serial No. 118,600, filed June 25, 1926, whereby the reaction can be conducted at temperatures below 700° C. to produce a product of better quality. This reaction depends upon the use of a heated catalyst free from catalyst poisons which converts the mixture, likewise free from catalyst poisons, at the relatively low temperature. The preferred catalyst consists of nickel with a promotor which advantageously is combined with the nickel in the form of a compound. Various promoters are mentioned in the application, including cerium oxide, yttrium oxide, thorium oxide, zirconium oxide, molybdenum oxide, vanadium oxide, tungsten oxide, uranium oxide, titanium oxide, glucinum oxide, chromium oxide, aluminum oxide, manganese oxide, silicon oxide, tantalum oxide, boron oxide, zinc oxide, cadmium oxide, potassium oxide and calcium oxide. The catalyst may, for example, consist of mixtures of oxides of nickel and cerium, nickel and aluminum, nickel, cerium and aluminum, or nickel and chromium, a nickel chromate catalyst being particularly useful in the process.

In carrying out the process of the Williams application the gaseous mixture, consisting principally of saturated hydrocarbons with a sufficient quantity of steam, is passed over the catalyst while the latter is maintained at a temperature of approximately 500° C. and with a space velocity of 250 based on methane, (the space velocity is the volume of gas flowing under standard conditions of temperature and pressure per unit volume of catalyst per hour). The gases issuing from the catalyst should consist principally of hydrogen with some carbon dioxide, a small proportion of methane and less than 10% of carbon monoxide. Throughout the process the presence of catalyst poisons such as chlorine and sulphur should be avoided.

The process of the Williams application is designed more particularly for the treatment of saturated hydrocarbons and is suitable for the conversion of numerous gaseous products in which such hydrocarbons predominate. These gases contain, however, in some instances substantial amounts of unsaturated hydrocarbons, i. e., ethylene, propylene, acetylene, etc., and I have discovered that the latter compounds are not well adapted for catalytic conversion with steam to form hydrogen. The compounds react with steam to some extent but they decompose at the same time with the formation of carbon. The deposition of carbon has, of course, a bad effect upon the activity of the catalyst and clogs the gas passages through it.

It is the object of the present invention to provide an improved process of hydrogen production by catalytic reaction with steam which permits the utilization of unsaturated hydrocarbons.

Other objects and advantages of the invention will be apparent as it is better understood by reference to the following specification.

I have discovered that the unsaturated hydrocarbons which are present in gaseous mixtures adapted for conversion by reaction with steam into hydrogen can be utilized advantageously by converting them either before or during the reaction into saturated compounds. Thus, by hydrogenating these unsaturated hydrocarbons they are brought into a form which makes them amenable to the desired reaction with steam in the presence of a suitable catalyst for the purpose of producing hydrogen. The presence of such unsaturated hydrocarbons in the gaseous mixtures used may thus become an advantage because of the increased yield of hydrogen which can be obtained. The improved process comprises the treatment of the gaseous mixture, either before or during the reaction with steam, with sufficient hydrogen in the presence of a catalyst capable of causing the hydrogenation of the unsaturated compounds.

In carrying out the invention the gaseous mixture containing unsaturated hydrocarbons can be mixed if necessary with a sufficient amount of hydrogen to accomplish the conversion into saturated hydrocarbons. This gaseous mixture can thereupon be passed over a suitable hydrogenation catalyst after which the necessary amount of steam can be supplied and the gaseous mixture now containing substantially only saturated hydrocarbons can be subjected with steam to the action of another catalyst at the necessary temperature to convert the mixture into hydrogen. Inasmuch as many of the commercial gases already contain a sufficient amount of hydrogen it may be unnecessary to add hydrogen thereto before subjecting the mixture to the hydrogenation catalyst. The amount of hydrogen, if any, to be added will depend upon the proportion of unsaturated compounds and the amount of hydrogen which exists already in the gaseous mixture. If additional hydrogen is required a convenient source thereof is found in the product of the conversion of previous quantities of the hydrocarbons with steam, that is to say, the hydrogen necessary for the preliminary treatment of unsaturated hydrocarbons may be obtained by recirculating a part of the gaseous mixture resulting from the final conversion. The recirculated gases are preferably but not necessarily freed from steam before reuse.

Alternatively, as hereinbefore indicated, the hydrogenation and conversion with steam may be conducted in a single operation. Thus the gaseous mixture containing unsaturated hydrocarbons may be supplied with the necessary quantity of hydrogen and mixed with steam whereupon it can be conveyed over a suitable catalyst while the latter is maintained at the required temperature. As the result of the operation the unsaturated hydrocarbons take up hydrogen and the saturated hydrocarbons are converted simultaneously by the action of steam and the catalyst into hydrogen. If a considerable proportion of saturated hydrocarbons exist originally in the gaseous mixture it may not be necessary to add any considerable proportion of hydrogen to the mixture because the hydrogen produced by the reaction with steam will be available for the saturation of any unsaturated hydrocarbons which exist in the mixture.

For the separate hydrogenation of the unsaturated compounds various hydrogenation catalysts may be employed. Such catalysts are well known and include copper, nickel, cobalt and platinum black. For the simultaneous hydrogenation and conversion of the saturated compounds into hydrogen it is desirable to employ a catalyst of the type described in the Williams application hereinbefore mentioned.

The following example will illustrate the application of the invention, it being understood that the invention is not limited to the particular details as herein described.

To a 6% solution of nickel nitrate, heated to 40° C., add 6% of ammonia water at the same temperature until precipitation is complete. Wash the precipitate, filter and dry at 110° C. Screen the dried material to 6-8 mesh and reduce at 300° C. in a stream of pure hydrogen. The catalyst thus prepared is placed in a silica tube disposed in an electric furnace. By-product gas obtained in the cracking of oils, freed from catalyst poisons such as sulphur compounds, and having a composition approximating 10% of ethylene, 10% hydrogen, 50% methane and 30% ethane, is passed with 10 volumes of hydrogen for each 100 volumes of gas over the reduced nickel catalyst which is maintained at a temperature of about 250° C. To each volume of the gaseous mixture so obtained 6 volumes of steam are added and the mixture is passed over a catalyst for the conversion of steam and hydrocarbons into hydrogen such as the catalysts mentioned in the Williams application and hereinbefore described. The catalyst is disposed in a silica tube and is maintained at a temperature of 550° C.

As an example of a suitable catalyst for the conversion of the saturated hydrocarbons into hydrogen, dissolve 70 parts of nickel nitrate free from sulphate and chloride in 1000 parts of distilled water. Add this solution, while stirring, to a boiling solution of 55 parts of potassium chromate in 1000 parts of distilled water. Wash the resulting precipitate until free from nitrates by decantation with cold distilled water. Collect on a filter, knead well and dry for 24 hours at 120° C. and for 4 hours at 150° C. Break up the resulting cake and screen to 6-8 mesh.

Among the advantages of the process as described are the avoidance of losses due to the separation of carbon from the unsaturated hydrocarbon compounds of the gaseous mixture used and the increased production of hydrogen which results because of the availability of the hydrocarbons in the form best suited for conversion to hydrogen. Another advantage arises from the fact that heat is developed in the hydrogenation reaction and this heat is available in maintaining the temperature necessary for the endothermic reaction of the saturated hydrocarbons with steam. The heat produced may be utilized in any suitable way.

As has been indicated the catalyst and the gaseous mixture should be free from catalyst poisons. The gases in particular should be free from sulphur compounds which cause rapid deterioration of the hydrogenation catalyst. The necessity for removing sulphur compounds is not, however, a disadvantage because in the subsequent conversion of the hydrocarbons into hydrogen it is important, as stated in the Williams application hereinbefore mentioned, that catalyst poisons be excluded from the reaction. Consequently the removal of sulphur compounds from the gaseous mixture is merely a preliminary step for the production of hydrogen by the reaction with steam.

While I have described the process in some detail and with particular reference to a gaseous mixture of special composition, it is to be understood that the details of proportions, temperatures and catalyst employed in conducting the reaction may be varied within wide limits without departing from the invention or sacrificing any of the advantages thereof.

I claim:—

1. In a process for producing hydrogen by the catalytic reaction of steam and a gaseous mixture containing unsaturated hydrocarbons, the step of eliminating the unsaturated hydrocarbons which comprises passing said gaseous mixture with hydrogen over a heated hydrogenation catalyst.

2. The process of producing hydrogen from a gaseous mixture containing unsaturated hydrocarbons, which comprises passing the gaseous mixture with hydrogen over a heated hydrogenation catalyst, and passing the resulting gases with steam over a heated catalyst to convert the hydrocarbons and steam into hydrogen.

3. The process of producing hydrogen from gaseous mixtures containing unsaturated hydrocarbons, which comprises passing the gaseous mixture with hydrogen and steam over a heated catalyst to hydrogenate the unsaturated hydrocarbons and convert the hydrocarbons and steam into hydrogen.

4. The process of producing hydrogen from a gaseous mixture containing unsaturated hydrocarbons, which comprises hydrogenating the unsaturated hydrocarbons and passing the resulting gases with steam over a heated catalytic body active for the conversion of a mixture of steam and hydrocarbons into hydrogen.

5. The process of producing hydrogen from a gaseous mixture containing unsaturated hydrocarbons, which comprises hydrogenating the unsaturated hydrocarbons and passing the resulting gases with steam over a heated catalytic body including a promoter and active for the conversion of a mixture of steam and hydrocarbons into hydrogen.

6. The process of producing hydrogen from a gaseous mixture containing unsaturated hydrocarbons, which comprises passing the gaseous mixture with hydrogen over a heated hydrogenation catalyst, passing the resulting gases with steam over a heated catalyst to convert the hydrocarbons and steam into hydrogen and using the heat produced by hydrogenation to maintain the temperature necessary for the reaction between steam and the hydrocarbons.

In testimony whereof I affix my signature.

ROGER WILLIAMS.